(12) United States Patent
Schmitz et al.

(10) Patent No.: US 6,759,669 B2
(45) Date of Patent: Jul. 6, 2004

(54) MULTI-POINT DISTANCE MEASUREMENT DEVICE

(75) Inventors: Roger W. Schmitz, Hutchinson, MN (US); Senthil Balasubramaniam, Chaska, MN (US); Roger S. Posusta, Silver Lake, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 350 days.

(21) Appl. No.: 09/757,784

(22) Filed: Jan. 10, 2001

(65) Prior Publication Data

US 2002/0088922 A1 Jul. 11, 2002

(51) Int. Cl.⁷ .............................................. G01N 21/25
(52) U.S. Cl. .............................. 250/559.29; 250/559.2
(58) Field of Search .................... 356/614, 615, 356/622, 3.1, 3.14, 620; 250/201.6, 225, 201.5, 201.1, 201.2, 201.3, 201.4, 559.06, 559.15, 559.23, 559.19, 559.11, 559.18, 559.29; 360/77.03; 280/559.09, 559.38, 559.29, 559.19, 559.2

(56) References Cited

U.S. PATENT DOCUMENTS

| | | | | |
|---|---|---|---|---|
| 5,568,337 A | * | 10/1996 | Eguchi et al. | 360/78.11 |
| 5,636,013 A | * | 6/1997 | Swift | 356/3.03 |
| 5,832,764 A | | 11/1998 | Girard | |
| 5,929,987 A | | 7/1999 | Hayes | |
| 6,236,454 B1 | * | 5/2001 | Almogy | 356/237.3 |
| 6,327,520 B1 | * | 12/2001 | Hooker et al. | 700/259 |
| 2002/0021523 A1 | * | 2/2002 | Ishizuka | 360/77.03 |

* cited by examiner

*Primary Examiner*—Edward J. Glick
*Assistant Examiner*—Hoon Song
(74) *Attorney, Agent, or Firm*—Faegre & Benson LLP

(57) ABSTRACT

A measurement device includes a laser or other light source for producing a light beam, and optics that split the light beam into a plurality of differentiable beam portions, such as a plurality of polarized beams. The optics also direct the differentiable beam portions toward a target to be measured. The measurement device also includes a detection component, such as a plurality of position sensitive detectors, positioned to intercept images created by simultaneous incidence of the differentiable beam portions on the target. The data collected by the detection component is used to calculate measurement data related to the target. When used with a head suspension target, displacement of various regions of the head suspension may be measured relative to a reference region, such as the mounting region of the head suspension.

45 Claims, 9 Drawing Sheets

MULTI-POINT DISTANCE MEASUREMENT DEVICE

FIELD OF THE INVENTION

This invention relates to measurement devices using a light beam to measure distance to an object and, in particular, simultaneous multi-point measurement devices using a single laser source.

BACKGROUND OF THE INVENTION

Head suspensions are well known and commonly used within dynamic magnetic or optical information storage devices or drives with rigid disks. The head suspension is a component within the disk drive that positions a magnetic or optical read/write head over a desired position on the storage media where information is to be retrieved (read) or transferred (written). Head suspensions for use in rigid disk drives typically include a load beam that generates a spring force and that supports a flexure to which a head slider having a read/write head is to be mounted. The load beam includes a mounting region at a proximal end, a rigid region at a distal end, and a spring region between the rigid region and the mounting region for providing the spring force. The spring region of each load beam is rolled or otherwise bent in such a manner as to plastically bend or deform the spring region, thereby imparting a curved shape to the spring region and causing the flexure to be offset from the mounting region in a z-height direction when the suspension is in its unloaded or free state.

Head suspensions are normally combined with an actuator arm or E-block to which the mounting region of the load beam is mounted with a base plate so as to position (by linear or rotary movement) the head suspension, and thus the head slider and read/write head, with respect to data tracks of the rigid disk. The rigid disk within a disk drive rapidly spins about an axis, and the head slider is aerodynamically designed to "fly" on an air bearing generated by the spinning disk. The spring force (often referred to as the "gram load") generated by the load beam urges the head slider in a direction opposing the force generated by the air bearing. The point at which these two forces are balanced during operation is the "fly height" of the head slider.

The flexure typically includes a slider bond pad to which a head slider is attached. The flexure attached to the load beam provides a resilient connection between the slider and the load beam, and permits pitch and roll motion of the head slider and read/write head as they move over the data tracks of the disk in response to fluctuations in the air bearing caused by fluctuations in the surface of the rigid disk. Head suspension flexures can be provided in numerous ways, including designs in which the load beam and flexure are formed integrally with one another (a two-piece design comprising the base plate and the integral load beam/flexure) and designs in which the flexure is a separate piece from the load beam (a three-piece design comprising the base plate, the load beam and the separate flexure). One three-piece design includes a flexure having a resilient tongue and two resilient spring arms. The head slider is supported on the resilient tongue (i.e. the slider bond pad), which is in turn supported between the spring arms. The spring arms are connected to a flexure mounting region, which is in turn connected to the load beam. The gram load provided by the spring region of the load beam is transferred to the flexure via a dimple that extends between the rigid region of the load beam and the flexure. The spring arms allow the tongue of the flexure to gimbal in pitch and roll directions to accommodate surface variations in the spinning magnetic disk over which the slider is flying. The roll axis about which the head slider gimbals is a central longitudinal axis of the head suspension. The pitch axis about which the head slider gimbals is perpendicular to the roll axis. That is, the pitch axis is transverse to the longitudinal axis of the load beam, and crosses the roll axis at or around the head slider.

In order to store and retrieve data from magnetic or optical disks on which data is densely packed, it is necessary for the head slider to fly closely above the surface of the spinning data disk (on the order of 0.1 μm) without colliding with the disk ("crashing"). Further, because of the dense packing of data on magnetic or optical disks, it is important for the read/write head attached to the head slider to be able to read from or write to a relatively small area or spot on the disk.

One performance-related criteria of a suspension is specified in terms of its resonance characteristics. In order for the head slider assembly to be accurately positioned with respect to a desired track on the magnetic disk., the suspension must be capable of precisely translating or transferring the motion of the positioning arm to the slider assembly. An inherent property of moving mechanical systems, however, is their tendency to bend and twist in a number of different modes when driven back and forth at certain rates known as resonant frequencies. Any such bending or twisting of a suspension causes the position of the head slider assembly to deviate from its intended position with respect to the desired track. Since the head suspension assemblies must be driven at high rates of speed in high performance disk drives, the resonant frequencies of a suspension should be as high as possible.

The position, shape and size of the roll or bend in the spring region of a suspension, sometimes generally referred to as the radius geometry or profile of the suspension, can greatly affect its resonance characteristics. The radius geometry of a suspension must therefore be accurately controlled during manufacture to optimize the resonance characteristics of the part. The radius geometry of a suspension may be characterized by different parameters. By way of example, Hutchinson Technology Incorporated, the assignee of the present application, has often characterized the radius geometry of suspensions using a number of parameters including those referred to as "height," and "depth" or "rippel."

A radius geometry related z-height is often measured using a laser triangulation probe, also known as a point range sensor. Optical point range sensors are generally known and commercially available from a number of suppliers, including WYKO Corporation of Tucson, Ariz. The point range sensor produces a focused or converging beam of light which is directed at a known angle to a point to be measured on the surface of the suspension or other target. An image of the spot of light produced on the target is projected onto a detector. The position of the image of the light spot on the detector will vary as a function of the distance between the instrument and the measurement target, i.e., the suspension. The position of the image of the light spot on the detector can then be correlated by triangulation to a z-height measurement. The point range sensor may provide a height parameter measurement of the suspension when the suspension is in various configurations, such as when the suspension is in a rest position or when it is elevated to the fly height. Laser triangulation offers relatively fast point readings with measurements in less than 1 millisecond, and can offer relatively good distance accuracy.

The currently preferred location on the suspension for measuring the radius geometry related z-height, hereinafter referred to as RG height, is in the spring region. Preferably, two measurements are taken, one on either side of spring region. In order to provide both measurements, the point range sensor must be mounted on a movable stage or other movable device, or the suspension must be mounted on a movable device. A triangulated height measurement is then taken on a first side of the spring region by the point range sensor. The sensor and suspension are then moved relative to one another, such as by movement of the sensor on the movable stage, and a second height measurement is taken on a second side. These two height measurements may then be averaged and the difference between the two measurements, known hereinafter as the Delta height, is then also calculated.

Although measurement of z-height at a point on a target by a point range sensor, as described above, is relatively accurate, the need to move the sensor and/or the target to obtain a second z-height reading causes errors and inaccuracies to occur in the averaged RG height and Delta height measurements. These errors are mainly due to actuation of the movable stage by a motor, which in turn produces heat that causes distortion of the stage and sensor or suspension mounting structure. It has been measured that the temperature increase in the mounting structure can cause as much as a 7 micrometer difference in a height measurement that is only about ±20 micrometers. In addition, the need to measure two points and move the sensor between measurements causes a cycle time delay that may be about 100 milliseconds.

The current need within the head suspension industry for ever smaller and more accurate suspensions has produced a corresponding need for more accurate measurements. There is also a continuing need to develop more efficient methods for correcting head suspension parameters without significant impact on other performance criteria of the head suspension for which accurate measurements would be useful.

SUMMARY OF THE INVENTION

A measurement device in accordance with the present invention overcomes the shortcomings of presently available measurement devices by providing the ability to measure multiple points on a target simultaneously, quickly and accurately using a single light source, such as a laser. The measurement device may include a laser for producing a laser light beam and optics that split the laser beam into a plurality of differentiable beam portions, such as a plurality of polarized beams. The optics also direct the differentiable beam portions toward the target to be measured producing light spots on the target. The measurement device also includes a detection component, such as a plurality of position sensing detectors, positioned to intercept the images of the light spots on the target projected towards the detectors. Additional beam reflecting and directing elements may also be included to facilitate detection of the images of the light spots.

The data collected by the detection component may be used to calculate measurement data related to the target. When used with a head suspension target, displacement of various regions of the head suspension may be measured relative to a reference region, such as the mounting region of the head suspension. In particular the target region on the head suspension may include the spring region and, from the displacement measurements, RG height and Delta height values may be determined. The present invention measurement device maybe incorporated into a head suspension production system, thus allowing for rapid adjustment of characteristic parameters of the head suspension during production.

DETAILED DESCRIPTION OF THE INVENTION

Figure 1:
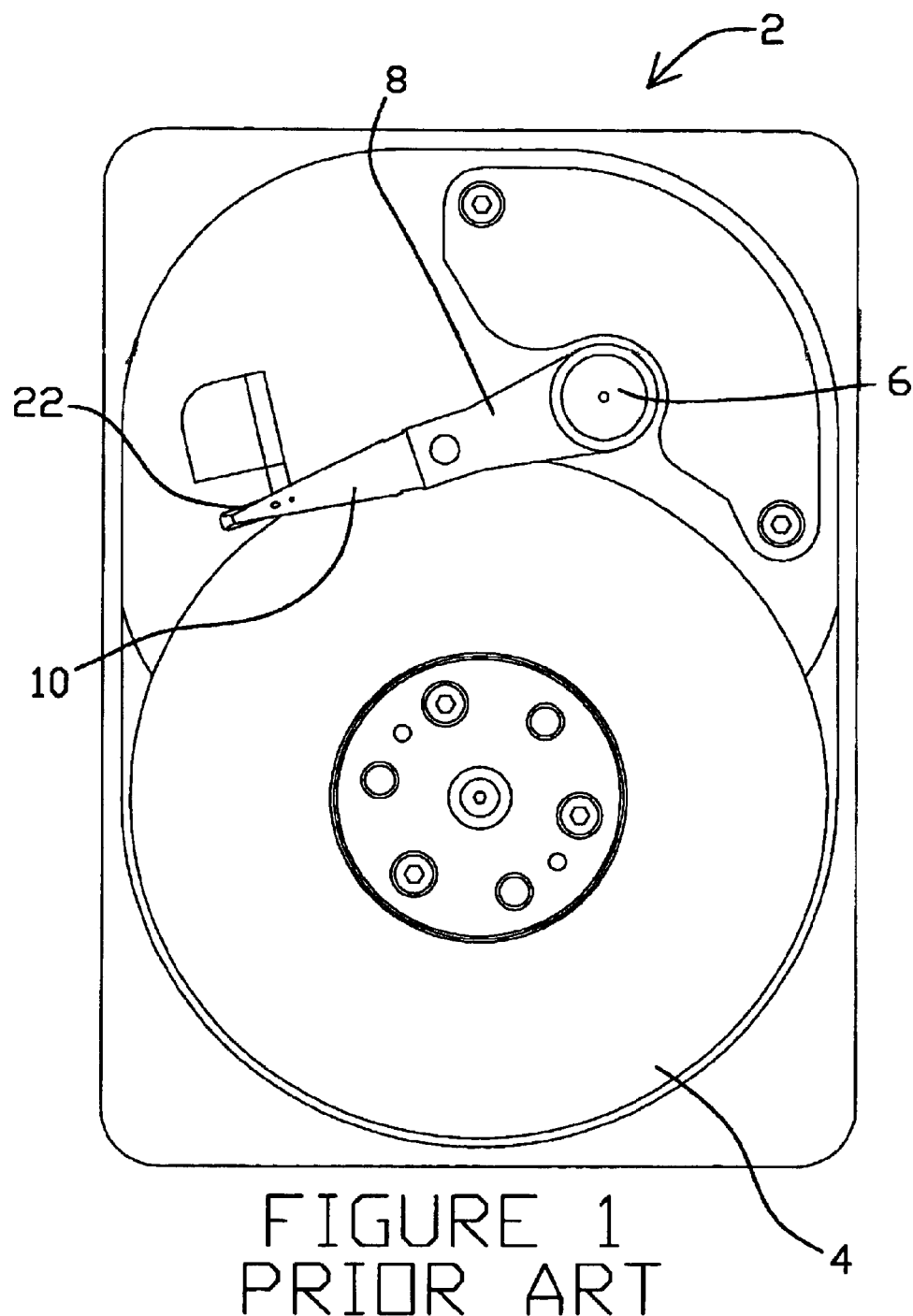
FIG. 1 is plan view of a disk drive assembly.

With reference to the attached Figures, it is to be understood that like components are labeled with like numerals throughout the several Figures. FIG. 1 is an embodiment of a disk drive 2 having a head suspension 10 suspended over a disk 4. Head suspension 10 supports a head slider 22 at its distal end over the disk 4. Head suspension 10 is attached at its proximal end to an actuator arm 8, which is coupled to an actuator motor 6 mounted within disk drive 2. Actuator motor 6 is used to position the actuator arm 8, head suspension 10, and slider 22 over a desired position on the disk 4. In the embodiment shown, actuator motor 6 is rotary in nature, and operates to radially position the head suspension 10 and slider 22 over disk 4. Other actuator motors, such as a linear actuator motor, can of course be used.

In use, head slider 22 with a magnetic head reads and/or writes data to and from disk 4 in disk drive 2, and the head suspension 10 supports and aligns the head slider 22 over a desired location on disk 4 in response to signals received from a microprocessor (not shown). Disk 4 rapidly spins about an axis, and an air bearing is created by rotating disk 4. Head slider 22 is aerodynamically designed to "fly" on the air bearing between the surface of the disk 4 and the head slider 22. As head slider 22 flies over the air bearing, it is urged away from the surface of the disk 4 by the air bearing. Head suspension 10 provides a gram load spring force that counteracts the force of the air bearing and urges the head slider 22 toward the surface of the disk 4. The point at which these two forces are balanced during operation is known as the "fly height" of the head slider.

Figure 2:
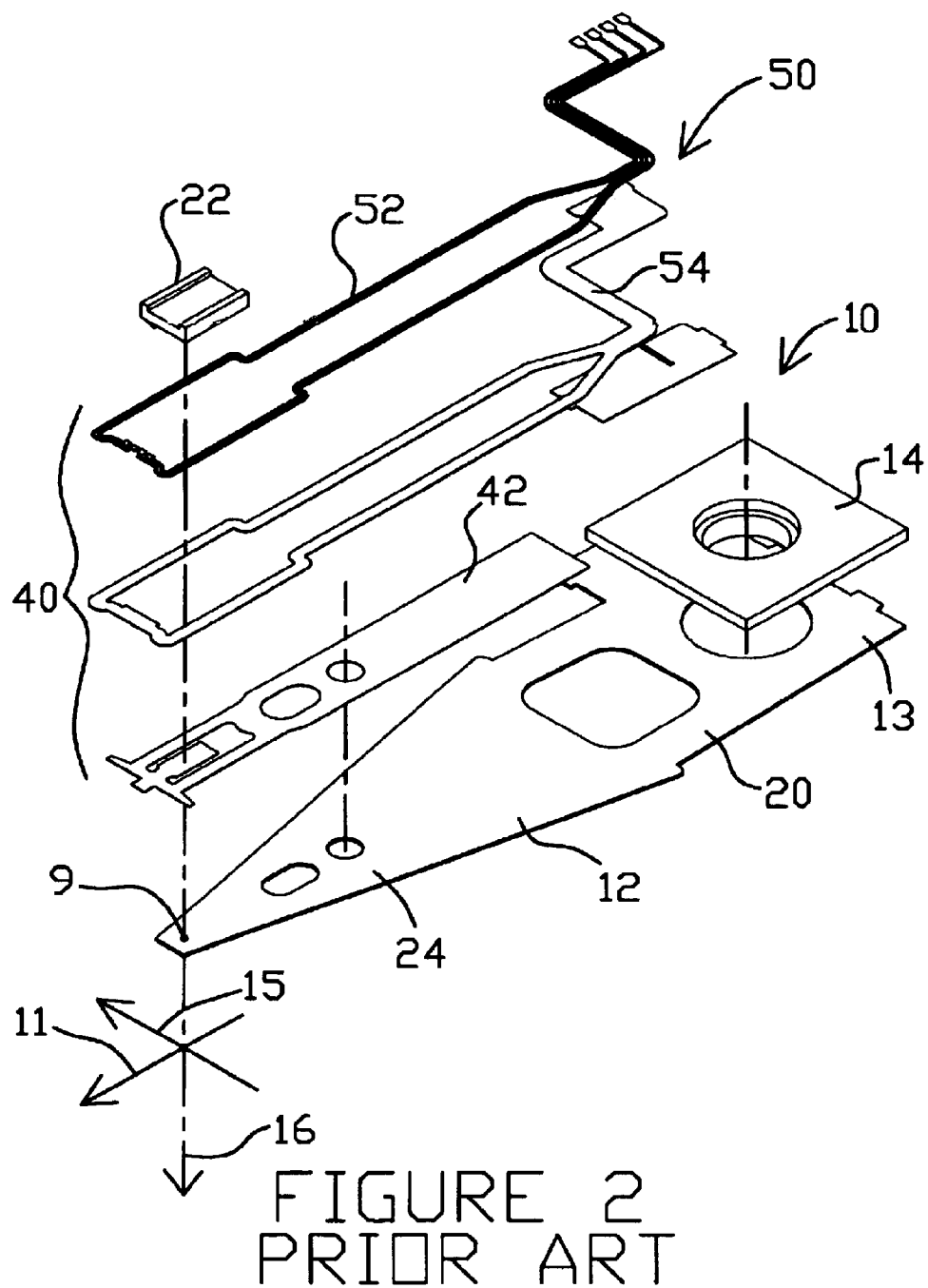
FIG. 2 is an exploded perspective view of a head suspension assembly including a load beam, a flexure, a head slider and a base plate.
Figure 3:
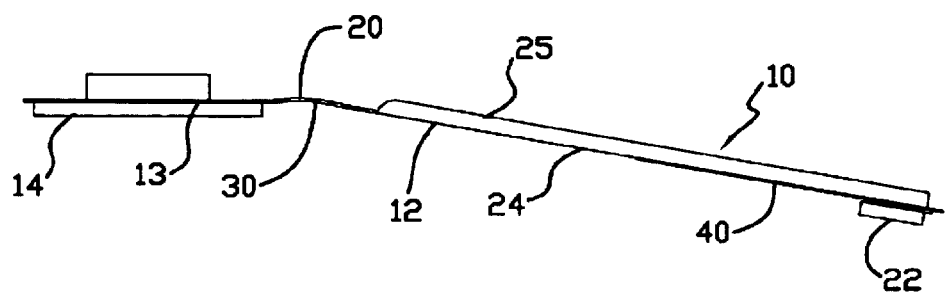
FIG. 3 is a side view of the suspension of a representative head suspension assembly, illustrating the profile of the spring region.

As shown in greater detail in FIG. 2, head suspension 10 is comprised of a plurality of separate components that are mounted together. Head suspension 10 includes a load beam 12 to which a flexure 40 is mounted. Load beam 12 includes a mounting region 13 at the proximal end of the load beam 12, to which a base plate 14 is mounted. Mounting region 13 and base plate 14 are mounted to the actuator arm 8 of disk drive 2 in a known manner. Load beam 12 further includes a rigid region 24 at the distal portion of the load beam 12, and a spring region 20 located proximal of the rigid region 24 and distal of the mounting region 13. As shown in FIG. 3, the rigid region 24 may also include side rails 25 to add further rigidity to the region 24.

Flexure 40 is mounted to the rigid region 24 of load beam 12 at flexure mounting region 42. Flexure 40 provides a resilient connection between head slider 22 and load beam 12, and is designed to permit head slider 22 to gimbal in response to variations in the air bearing generated by rotating disk 4. In the embodiment shown, flexure 40 also includes a trace assembly 50 (shown in exploded view in FIG. 2) that provides electrical interconnection between slider 22 and a microprocessor (not shown) of disk drive 2 to convey read and write signals to and from head slider 22. The trace assembly 50 of the shown embodiment is comprised of a conductive layer of material 52 formed into longitudinal traces that extend along the length of flexure 40, and an insulating layer of material 54 interposed between flexure mounting region 42 and the conductive layer 52.

The head suspension 10 is further shown to include longitudinal axis 11, also referred to as the x-axis, which is defined to extend along the center line of head suspension 10 and through the load point 9. Head suspension 10 also includes transverse axis 15, also referred to as the y-axis, which is defined to be orthogonal to axis 11 and intersect axis 11 at the load point between load beam 12 and flexure 40. In addition, z-axis 16 is defined to extend perpendicular to the plane defined by the longitudinal axis 11 and the transverse axis 15, in a direction away from the head slider 22.

Spring region 20 of load beam 12 provides a desired gram load that opposes the force exerted upon head slider 22 by the air bearing generated by rotating disk 4. The gram load is transmitted to flexure 40 through rigid region 24 of load beam 12. Toward this end, spring region 20 can include a preformed bend or radius 30 (shown in FIG. 3) that provides a precise gram load force as well as an offset distance in the z-axis direction between the mounting region 13 and the head slider 22.

Figure 4:
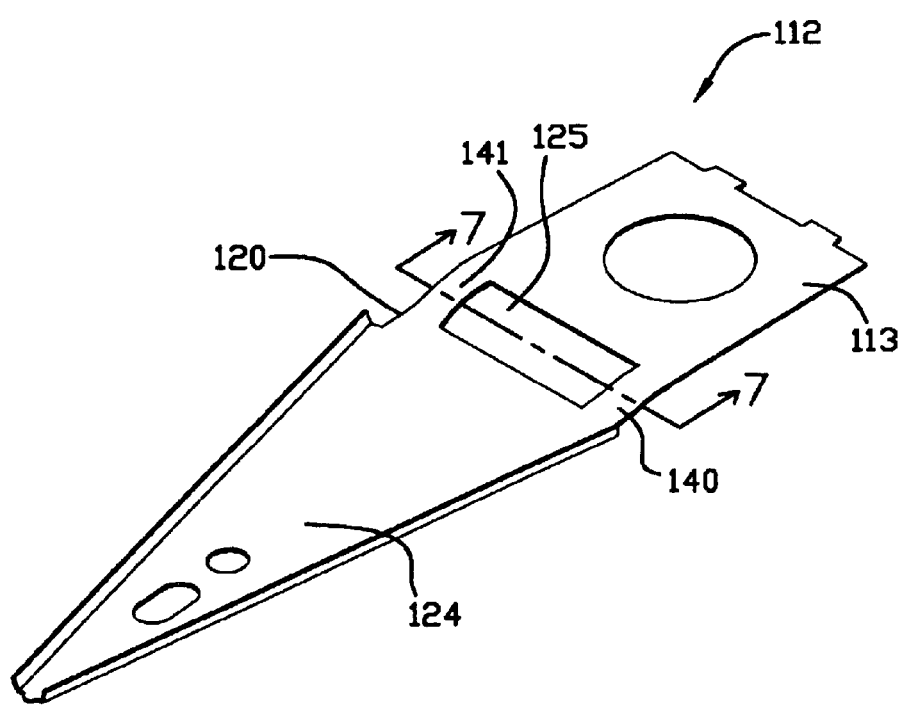
FIG. 4 is a perspective view of a load beam illustrating the spring region.

As stated above in the Background section, in order to maintain the resonance characteristics of a suspension within acceptable limits, the radius geometry of the suspension's spring region must be tightly controlled. As a result, the radius geometry height or RG height must be monitored quickly and accurately at various stages in the manufacturing process so that it may be compared to desired height values and allow for adjustments to be made to the suspension, if needed. Measurement of the RG height preferably includes two height measurements taken one on either side of the spring region. Referring now to FIG. 4, another embodiment of a load beam 112 is shown including a mounting region 113, a rigid region 124 and a spring region 120 located between the two. The spring region 120 includes an aperture 125 which forms first and second spring arms 140 and 141, respectively, on either side of the aperture 125. The two height measurements are preferably taken on or near the first and second spring arms 140, 141 to provide the RG height and the Delta height, as described above.

Figure 5:
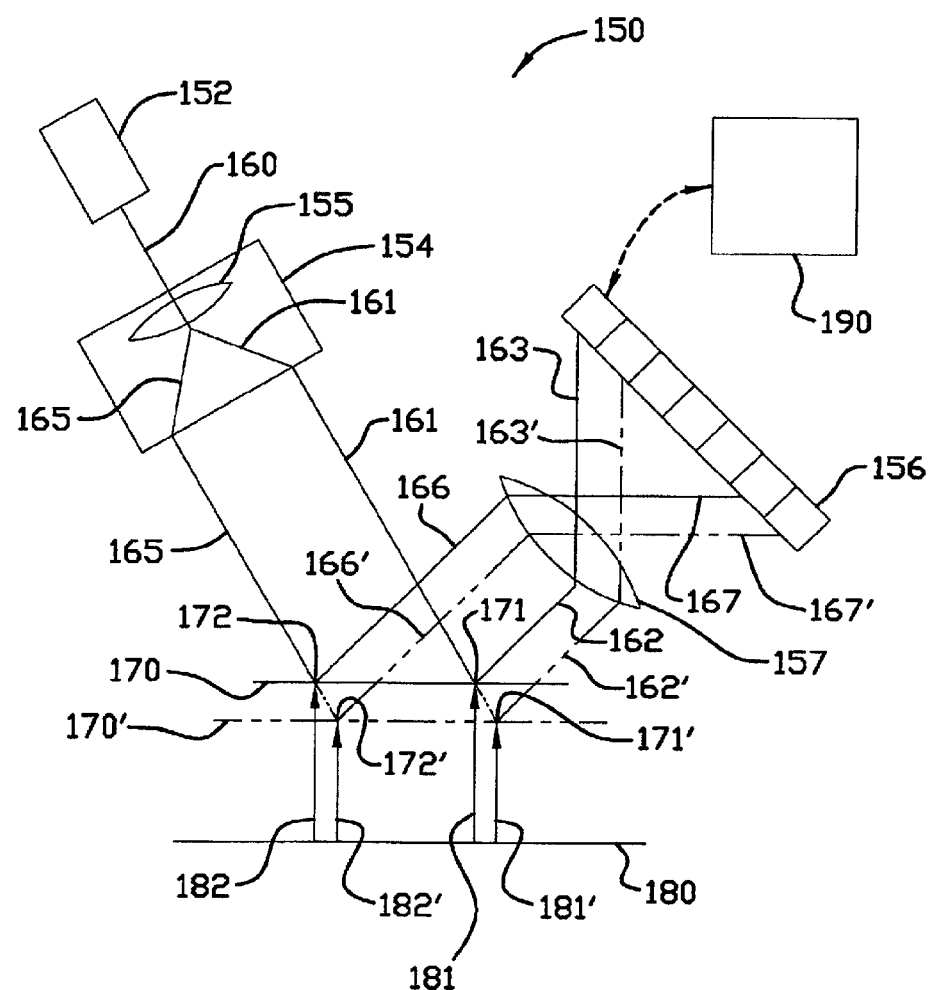
FIG. 5 is a diagram illustrating one embodiment of a measurement device of the present invention, including a laser, beam splitting optics and a detection component.

The present invention provides a measurement device capable of measuring the z-axis height at multiple points on a target simultaneously without the need for movement of either the measurement device or the tat get being measured. Referring now to FIG. 5, a measurement device 150 of the present invention generally includes a laser 152 whose beam 160 is split into a plurality of differentiable beams 161, 162 by optics 154. The differentiable beams 161, 162 are then directed onto a target 170 being measured at points 171, 172, producing light spots at points 171 and 172. Images of the light spots at 171, 172 are projected from the target 170 as diffused light, represented by lines 162 and 166, which is then captured and focused by lens 157. The focused projected images, as shown by lines 163 and 167, are then projected onto a detection component 156, such as a position sensing detector. A control unit 190, such as a computer, microprocessor or other suitable component, in electrical connection with the detection component 156 monitors the detection results and computes distances 181, 182 at the target locations 171, 172, respectively, from a reference datum 180 based on known information gathered during set up and/or calibration of the measurement device 150, in combination with the detection results.

As the distance from the target 170 to a datum reference 180 varies, as shown by phantom target 170', the locations where the light spots at points 171' and 172' strike the phantom target 170' will vary. The diffused light projected from these light spots at 171', 172', shown by phantom lines 162', 166', strikes the lens 157 differently resulting in projected images, shown as phantom beams 163', 167', that strike the detection component 156 in different locations. The detection component 156 is sensitive to these variations in image location impingement. The detection component 156 may be formed as an array of detectors that are individually activated by each projected image 163, 163', 167, 167' and provide positional information to the control unit 190. Alternatively, the detection component 156 may be formed as another type of detector having positional sensitivity to differentiate between different locations of beam impingement. The distances 181', 182' from the reference datum 180 for light spots at the new target locations 171', 172' may then be calculated.

By comparing each beam's position on the detection component 156 to known information, the system may triangulate distance measurements for each point on the target 170 from the reference datum 180. These distance measurements may then be compared with other known information to calculate the z-height values of the target points relative to the remainder of the target, which then may be used to provide the RG and Delta height results when the target 170 is a head suspension. The reference datum 180 may be a reference surface on the measurement device 150, a known surface on a holder (not shown) for the target 170, a predetermined location on the head suspension, or other suitable surface. It is to be understood, however, that although the illustrative embodiments include height measurements relating to head suspensions, use of the present invention is not limited to head suspension measurements, but may be utilized wherever multi-point simultaneous distance measurements are required.

Figure 6:
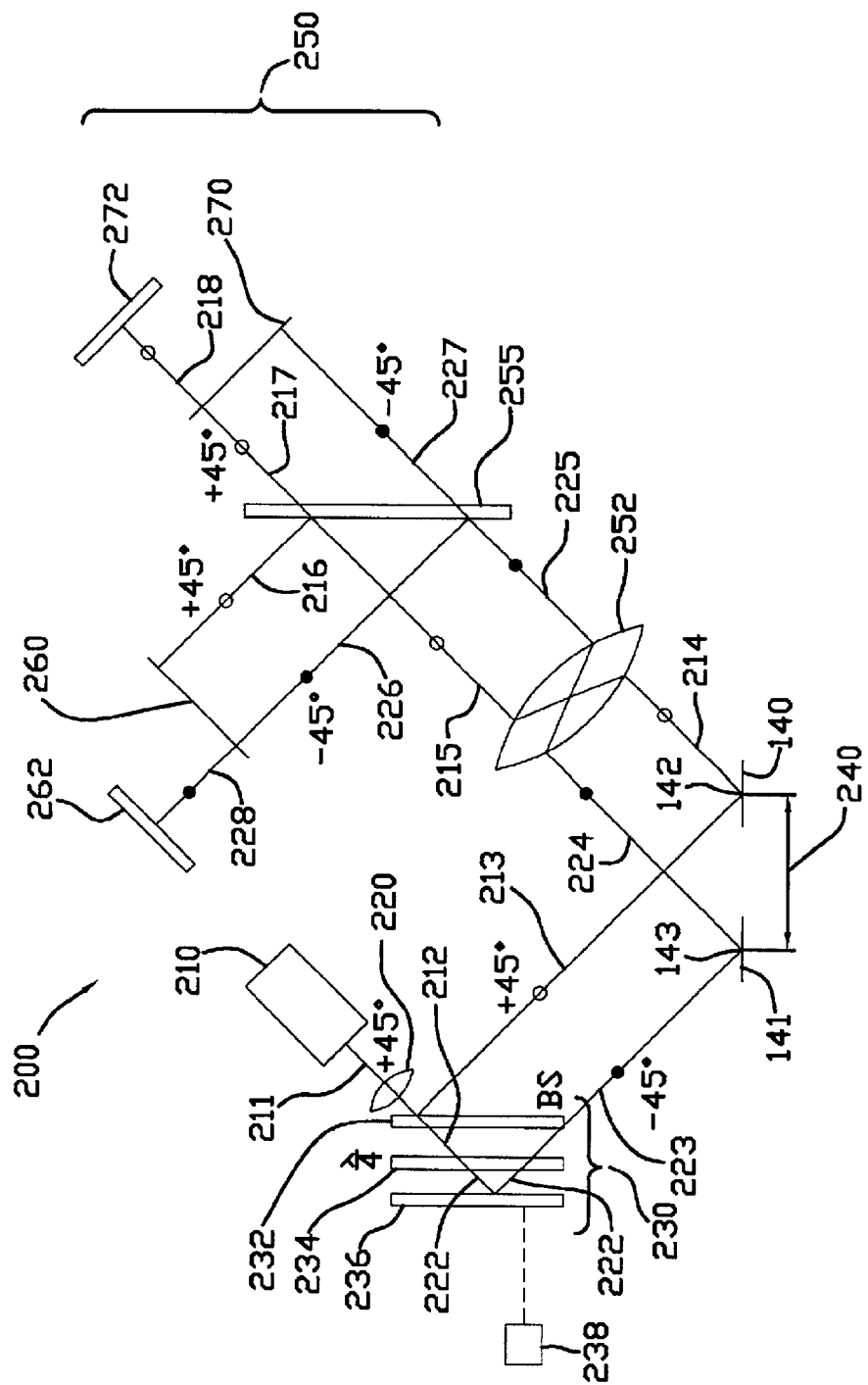
FIG. 6 is a diagram illustrating another embodiment of a measurement device of the present invention, including beam splitting and polarization optics and multiple detectors.

Referring now to FIG. 6, one specific embodiment of a measurement device 200 of the present invention is illustrated for measurement of the z-axis height at two points of a target, shown as a cross-section of spring region 120 of the load beam 112 in FIG. 4, with spring arm 140 as a first target and spring arm 141 as a second target. The measurement device 200 includes a laser 210 that emits a laser beam 211. The laser 210 may be, but is not limited to, a diode laser or other usable laser, or may be another type of light source whose output beam may be focused to a reasonably small point while having suitable strength to produce the images required by the present invention. The laser beam 211 may be linearly polarized and have a specific phase angle, such as +45 degrees, however other types of laser beams or laser beam configurations are also usable.

The laser beam 211 passes through a projecting lens 220 that focuses the beam 211 into an even tighter beam of light. After lens 220, the beam 211 strikes optics 230 configured to split the beam 211 into multiple differentiable beams. In this embodiment, beam differentiation occurs due to polarization of the light, however other types of beam differentiation may also be used. For example, wavelength differentiation may alternatively be used such that a light beam is divided into beams having different wavelengths or multiple beams at different wavelengths may be provided. Other types of light beam differentiation may also be used, however the method of differentiation must provide for simultaneous multiple beams of light. Once beam differentiation takes place, beam isolation is readily possible by use of selective beam blocking devices, such as polarizing filters, wavelength exclusion optics i.e., band pass wavelength filters, or other devices.

Beam splitting and differentiation optics 230 include a beam splitter 232, which reflects a portion of the beam 213 toward the first target 140, and allows passage of a remaining portion of the beam 212. Both split beams 212 and 213 have the same phase angle (+45 degrees) as the original beam 211. In this embodiment, only two split beams 212, 213 are produced from the laser beam 211. It is to be understood, however, that more than two split beams may be produced by the optics 230 when needed in other applications or, alternatively, more than two differentiated beams may be provided, as described above. However, use of more than two split beams may result in the need for more complicated exclusion optics and detection components.

From the beam splitter 232, beam 212 is then passed through a quarter-wave plate 234 that rotates the polarity of the beam 212, resulting in a circularly polarized beam 222 that is then reflected by a movable mirror 236 toward the second target 141 and again through quarter-wave plate 234. Beam 222 is then rotated again by the quarter-wave plate 234 resulting in a beam 223 having a 90 degree phase difference from the input beam 212 and beam 213, or −45 degrees. Production of two beams 213, 223 that have relatively clean 90 degree phase differentiation facilitates later exclusion of one or the other of the beams 213, 223.

Polarized beams 213 and 223 strike the first and second targets, 140 and 141, producing light spots at points 142, 143, respectively. The projection lens 220 has a focal length configured to be the distance the beam 211 travels to the target. Therefore, once the beam 211 is split into differentiated beams 213, 223, path lengths of each beam 213, 223 should be relatively equal. With the configuration shown, the present embodiment provides substantially equal path lengths to the target 140, 141 for both beams 213, 223, respectively.

The versatility of the measurement device 200 is increased by providing adjustment of the spacing between the points where the differentiated beams 213, 223 strike the target, in order to accommodate different targets and different measurement needs without moving the part being measured or the measurement device 200. In the present embodiment, an actuator 238 may be included to adjust the distance 240 between the points 142, 143 on targets 140, 141 where the beams 213, 223 strike, respectively, as needed within a provided range. This distance adjustment is achieved through adjustment of the spacing between the beam splitter 232, the quarter-wave plate 234 and the reflecting mirror 236 by movement of the mirror 236. This results in an asymmetric adjustment to achieve the desired distance 240. For the embodiment shown, this distance 240 may range from about 0.5 millimeter to about 2.5 millimeters. At the lower end, the distance 240 is dependent on the thickness of the optics 230, especially beam splitter 232 and quarter-wave pate 234. For very thin optics 230, it may be possible to reduce the distance 240 to zero so that the beams 213, 223 overlap, if desired, which may or may not be useful in some applications. However, overlapping of the beams 213, 223 is not readily available with standard optics 230, so that the measurement device 200 must be specifically designed and built to provide this capability.

Once the differentiated beams 213, 223 strike the target, 140, 141 and produce light spots at points 142, 143, respectively, the light may be diffusely or directly reflected from the targets 140, 141. By accommodating diffuse reflection, the measurement device 200 may be used with targets having a variety of surface characteristics, and is not limited to use with shiny or other highly reflective surfaces. The reflected light, whether diffuse or direct, is represented by beam lines 214 and 224 from points 142 and 143, respectively, and maintains the polarization of the incident differentiated beams 213, 223, respectively. The reflected light 214, 224 is gathered by an imaging lens set 252 that converges or focuses the reflected light 214, 224 into focused beams 215, 225 and bends these beams 215, 225 prior to their exit from the lens set 252 and projection towards a detection component 250. Although shown as a single lens, lens set 252 may be configured as a single lens or as a multiple lens set in order to focus and optimize the images projected onto the detection component 250 in a desired manner.

In this embodiment, the detection component 250 includes a number of different elements, including a second beam splitter 255, which the focused beams 215, 225 first encounter after projection through lens set 252. For beam 215, beam splitter 255 produces a reflected beam portion 216 and a passed beam portion 217. For beam 225, beam splitter 255 produces a reflected beam portion 226 and a passed beam portion 227. The resulting reflected beam portions 216, 226 are directed in the same direction and are configured to be substantially parallel. These two beams 216, 226 next encounter a first polarization analyzer 260, such as a polarizing filter, configured to essentially purify the beams 215, 225 and filter out by blocking any undesirable beam portions. In this embodiment, the first analyzer 260 blocks anything but −45 degree polarized light, and thus sends a relatively pure −45 degree beam 228 to a first detector 262. Likewise, the resulting passed beam portion 217, 227 are directed in the same direction and are configured to be substantially parallel. These two beams 217, 227 then encounter a second polarization analyzer 270 that is configured to block anything but +45 degree polarized light, and thus sends a relatively pure +45 degree beam 218 to a second detector 272, preferably of the same type as first detector 262. Detectors 262, 272 may be photo detector arrays or position sensing detectors, or other suitable detectors configured for use with the type of differentiated light being used by the measurement device 200.

Rather than intercepting a directly reflected beam of light from the targets 140, 141, the detectors 262, 272 view an image of the light spots produced at point 142, 143. In the case of position sensitive detectors, each detector 262, 272 produces an analog output based on the position of the centroid of the spot image on the detector 262, 272. The detectors 262, 272 then provide the detected information to a processor (not shown) that compares the detected information to known information about the measurement device 200 and the targets 140, 141. The known information may be gathered during set up and/or calibration of the measurement device 200, wherein measurements are taken using targets having known heights. A linear interpolation is then calculated from the known measurements to provide height data for a range of measurements. From the compared data, the processor then determines a height value for each target 140, 141 from a known reference datum. As stated above, these height values may be used as RG height values and a Delta height may be calculated. Alternatively, the height values may be used for other purposes with other types of targets, as needed. In this embodiment, the measurement device 200 may provide real time measurements at speeds of about 0.4 millisecond.

Figure 7:
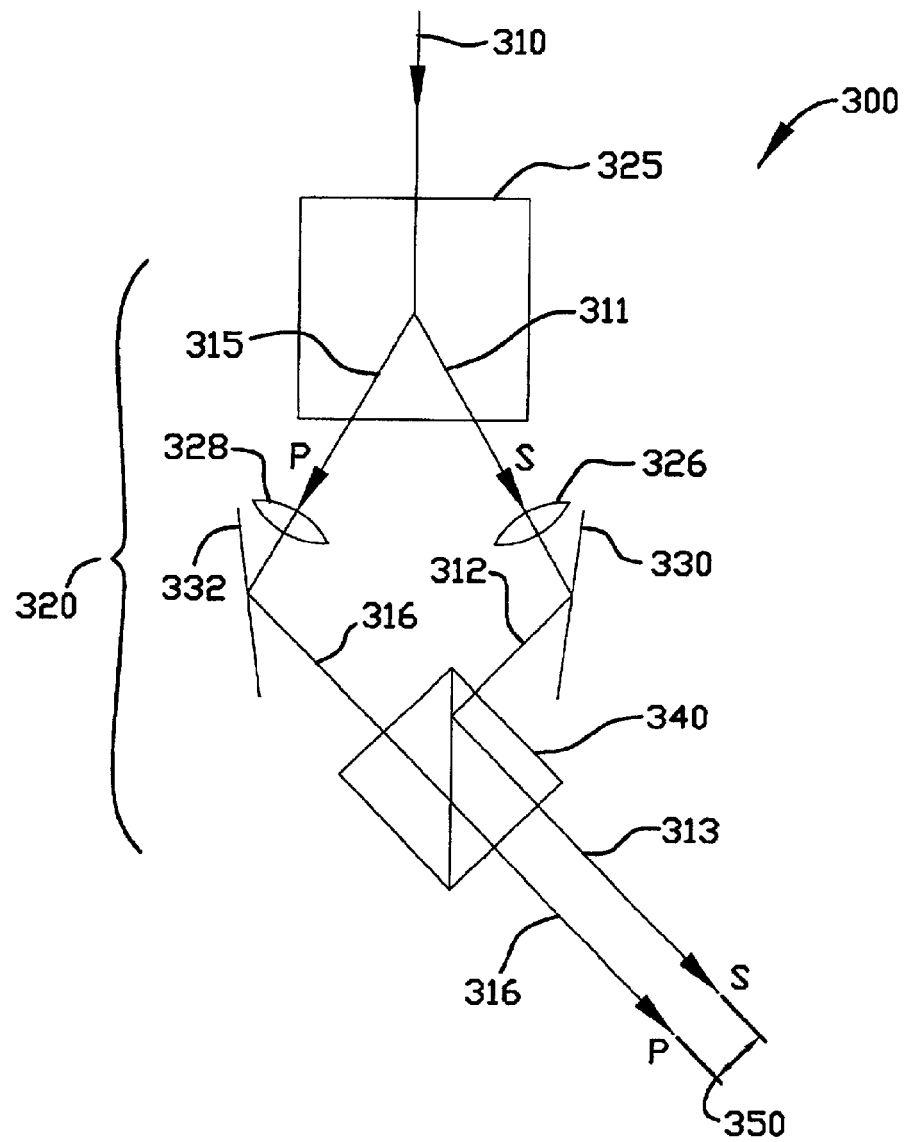
FIG. 7 is a diagram partially illustrating yet another embodiment of a measurement device of the present invention, including beam splitting optics using a Wollaston prism.

Referring now to FIG. 7, another embodiment of a measurement device 300 is partially shown. A light beam 310 emitted from a laser (not shown), or other light source enters optics 320, which include a Wollaston polarizing prism 325, a device known for producing linearly polarized beams of light. The Wollaston prism 325 splits the beam into polarized portions S (311) and P (315). The beams 311 and 315 then pass through projection lenses 326 and 328, respectively, before encountering movable mirrors 330 and 332, respectively. The mirrors 330, 332 angle the reflected beams 312, 316 toward a polarized reflecting cube 340. Beam 316, being at one polarized state 'P', passes through the cube 340 without interruption. Beam 312, however, being at another polarized state 'S', is reflected within the cube 340 to produce beam 313, which is configured to be parallel to beam 316. From cube 340, the parallel polarized beams 313, 316 pass on to produce light spots on a target (not shown), such as targets 140, 141 shown in the above described embodiment. With this configuration, the present embodiment provides substantially equal path lengths to the target for both beams 313, 316.

Upon encountering the target, the reflected light from the light spots on the target would be gathered and focused by an imaging lens set that would then project the images of the light spots onto a detection component, such as 250 shown in FIG. 6, which may include a beam splitter, analyzers and detectors. However, it is to be understood that other types of detection components that may include other elements may also be used, if desired, to view the images of the light spots.

Use of the combination of the Wollaston prism 325 and movable mirrors 330, 332 may allow the polarized beams to be directed and positioned with greater flexibility. Similar to the embodiment described above, one or more actuators (not shown) may be provided to move the movable mirrors 330, 332. By moving the mirrors 330, 332, the distance 350 between the polarized beams 313, 316, and thus the distance between the light spots, may be adjusted as needed within a provided range. This configuration provides for symmetric adjustment to achieve the desired distance 350. In this embodiment, the distance 350 may range from about zero millimeters to about 2.5 or more millimeters. As can be seen, the polarized beams 313, 316 may be readily configured to overlap, that is have a distance 350 equal to zero, if desired for a specific application. No special components are required to achieve beam overlap with this design.

Figure 8:
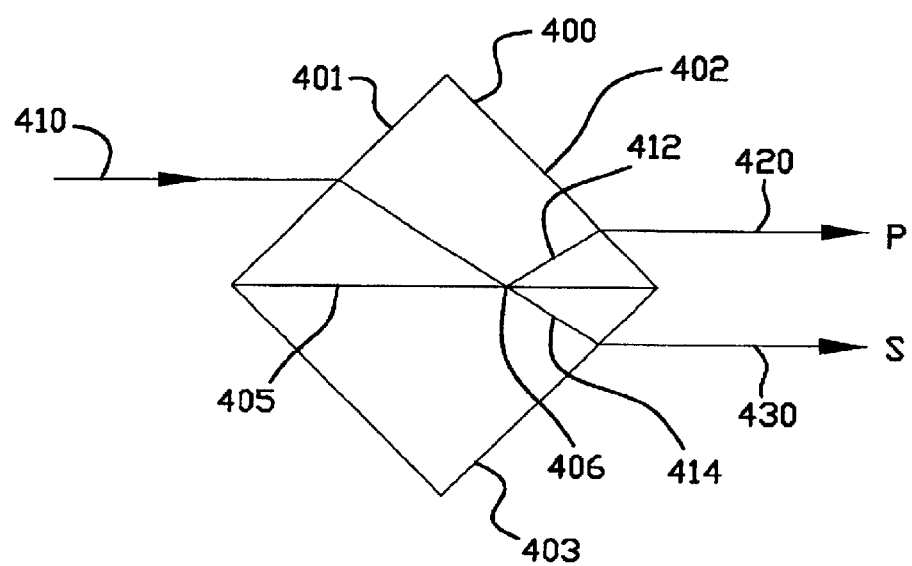
FIG. 8 is a diagram partially illustrating yet another type of optics usable to split and differentiate a light beam for use with the device of the present invention.

As shown in FIG. 8, other possible optics configurations for splitting and polarizing the laser beam include the use of a refraction cube 400. An incoming light beam 410, such as a focused laser beam described in the above embodiments, encounters the outer surface 401 of the refraction cube 400 and bends inward toward a center portion of the cube 400. The beam 410 intercepts a mid-line plane 405 at point 406 resulting in the splitting of the beam 410 into two polarized portions 412 and 414. One portion 412 is reflected off the plane 405 and is directed toward a second surface 402 of cube 400. As the reflected beam 412 passes through surface 402 it is bent to produce a first polarized beam 'P' 420 in a predetermined direction. The other portion 414 passes through the plane 405 toward a third surface 403 of cube 400. As the passed beam 414 passes through surface 403, it too is bent to produce a second polarized beam 'S' 430 configured to be parallel to polarized beam 420.

In yet another embodiment (not shown), a focused light beam may be passed through another type of optics, including a polarizing beam splitter cube that internally splits the laser beam and reflects a first polarized portion of the beam, passing through a second polarized portion of the beam. The second portion of the beam may then be reflected using a movable mirror, or other reflecting surface, that directs the second portion of the beam parallel to the first portion of the beam toward the target. This embodiment provides equal path lengths using only two standard optical components. However, with this configuration the polarized beams may not overlap and adjustment of the distance between the polarized beams is achieved through asymmetric movement of the mirror.

Yet other types of optics that may be used include the use of glass plates and a mirror to take advantage of the Brewster's angle phenomenon according to Brewster's law also known as the polarizing angle). Alternatively, it is also possible to design and build custom beam splitting optics to provide a specific distance between the polarized beams or to split and direct multiple beams that are differentiable in another manner.

Use of the measurement device of the present invention includes clamping a target into a holder (not shown) that may or may not be provided as part of the measurement device. In either case, the holder is preferably positioned and oriented relative to the device in a known or discernable manner to provide a reference datum for the target being measured. For the embodiments described above, this reference datum is preferably positioned at greater than about 20 millimeters from the reference surface of the device. Once the target is ready, the laser or other light source is activated such that differentiated beams strike the target producing light spots, which are then viewed by the detector component. A processor or other electronics then calculates distance measurements for the target at the light spots based on the detected data and the known data of the measurement device and holder. From these distance measurements, other information relating to the target may be calculated or otherwise determined.

As described in the above embodiments, the measurement device of the present invention may measure distances in the range of about ±1 millimeter from a known reference datum. In one embodiment, the resolution of the device as described, or the smallest increment that the device can measure, can range from about 0.03 micrometers to about 0.05 micrometers. It is also possible to achieve device linearity of about 2 micrometers over the given measurement range. Linearity is measured by plotting the measured displacement against the actual displacement of a target. In addition, the measurement device can have a tilt sensitivity of less than about 0.5 micrometers per degree, such that the measured displacement will include this amount of error due to the target being positioned at an angle to the laser beam.

The measurement device of the present invention allows for use of a single light source to make multiple measurements from one or more targets by splitting the light beam into differentiable beam portions and detecting images produced by those portions on the target with detectors. In addition to the embodiments described above, other methods and configurations for splitting the light beam into differentiable portions and/or detecting the beams reflected from a target are possible and may be apparent to one of skill in the art. It is to be understood that these various alternative configurations and methods are within the scope and spirit of the present invention.

With most of the embodiments described above having adjustable optics to provide varying distances between the beams encountering the target(s), the adjustment of the optics may be provided manually or may be automated. Automatic adjustment may be provided on the fly, such that the optics are adjusted for each new target based on an input by an operator, or based on information determined by the system (such as by a sensor) from the target. In addition, it may be desired to make multiple measurements at different locations on the same target. This may be achieved by movement of the optics to direct the beams at a different location along the target, as well as at a different distance between the beams, if desired. This may also be achieved by the use of more than two beams split from the light source. Alternatively, this may be achieved by movement of the measurement device relative to the target or by movement of the target relative to the device. However, movement of the device or the target by mounting either or both on a movable stage or other movable device would potentially create inaccuracies, such as those encountered with the presently available systems using a single laser beam.

Figure 9:
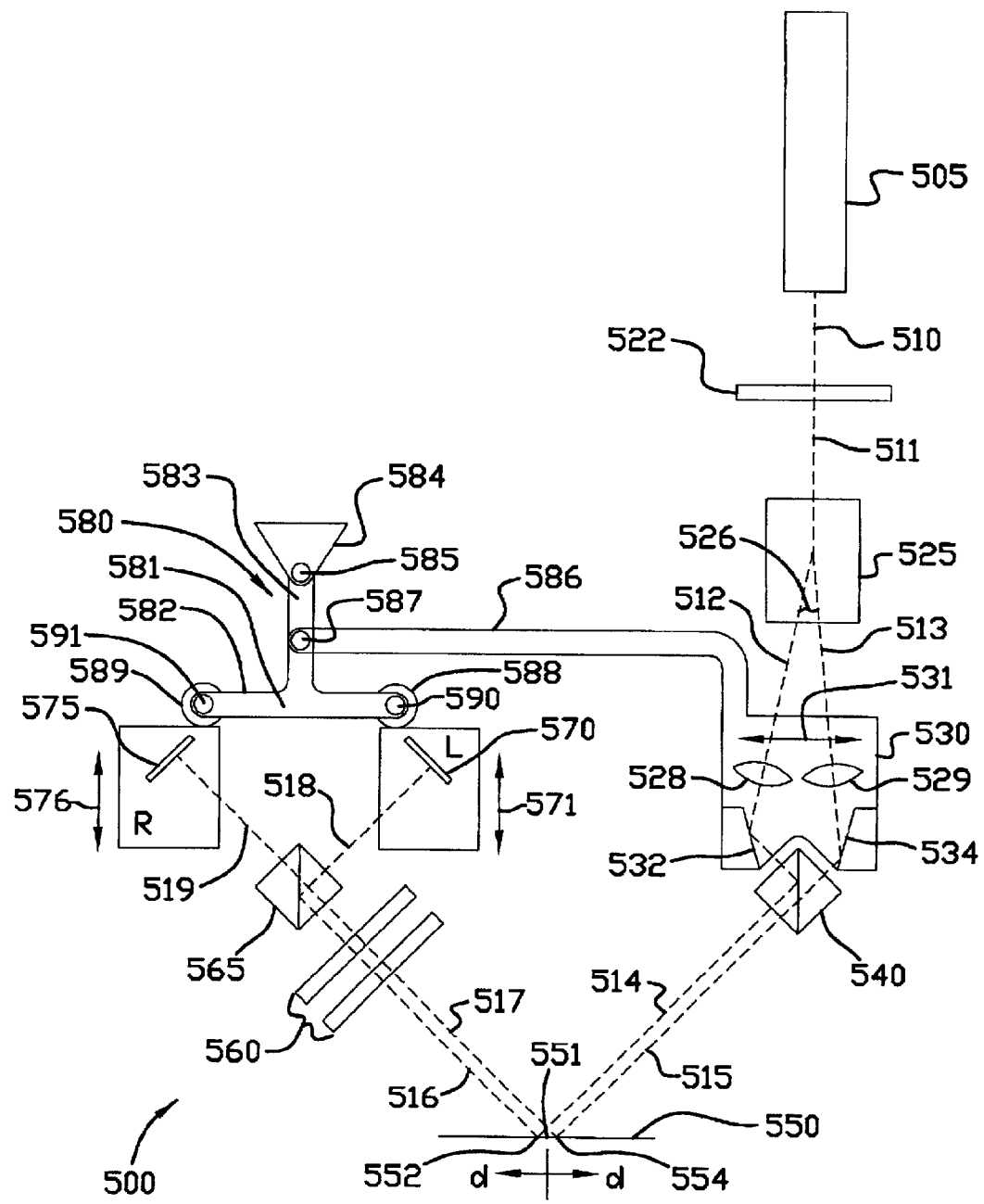
FIG. 9 is a diagram of yet another embodiment of a measurement device of the present invention, including an integrated adjustment mechanism.

Referring now to FIG. 9, an embodiment of a measurement device 500 in accordance with the present invention is shown, which is similar to the embodiments shown in FIGS. 6 and 7. The measure device 500 includes a light source 505 emitting a single light beam 510, such as a collimated laser beam. A polarizing lens 522 may be used to clean up the light beam 510 emitted from the light source 505, if necessary. A Wollaston prism 525 then splits and polarizes the focused beam 511 into two polarized beams 512 and 513 emitted at a separation angle 526. Typical separation angles 526 are in the range of about 20 degrees, however other separation angles 526 are possible. The polarized beams 512 and 513 are then passed through focusing lenses 528 and 529, respectively.

The angled polarized split beams 512 and 513 then encounter combining mirrors 532 and 534, respectively, mounted within a spot spacing stage 530. Spot spacing stage 530 may be bi-directionally translated, such as in the directions shown by arrow 531, to adjust the position of incidence of split beams 512, 513 on mirrors 532, 534, respectively. The reflected split beams 512, 513 then pass through a beam splitter 540 to produce parallel polarized beams 514, 515 that are directed toward a target 550.

The beams 514, 515 strike the target 550 at points 552 and 554, respectively, which are positioned about an equal distance 'd' from a center point 551 located at a point on the target where the two beams 514, 515 would strike if overlapped. Movement of the spot spacing stage 530 to move combining mirrors 532, 534 results in changes in the distance 'd', as needed. Diffuse images of the light spots at points 552 and 554 are shown represented by lines 516 and 517, respectively. Lens set 560 captures and focuses the diffuse beams 516, 517, which then encounter beam splitter 565. Reflected polarized beam 518 is directed toward detector 570 and the other polarized beam 519 is passed toward detector 575.

When the spot spacing stage 530 is translated in either direction 531 in order to adjust the location of spots 552, 554 on target 550, the images received by the respective detectors 570, 575 may become distorted or out of focus. Out of focus images may result in measurement errors, reducing the effectiveness of the measurement device 500. It has been found that movement of the detectors 570, 575 relative to the movement of the spot spacing stage 530 may bring the images back into focus on the detectors 570, 575. This movement may include normal movement, such as moving toward or away from the target 550 as shown, to keep the images in relatively constant position on the detectors 570, 575. This movement may also include translational movement, such as moving parallel to the movement of stage 530, to keep the images in focus. Preferably, both normal and translational movement are provided, resulting in angular movement, such as moving about 45 degrees to an optical axis of the device 500.

Movement of the detectors 570, 575 in response to movement of the mirrors 532, 534 may be accomplished independent of the movement of the mirrors 532, 534, either individually or together, manually or automatically. However, precise adjustment of the detectors 570, 575 based on movement of mirrors 532, 534 can be very difficult to coordinate. Alternatively, the movement may be tied to the movement of the mirrors 532, 534 to provide accurate, corresponding adjustment of the detectors 570, 575 based on movement of the mirrors 532, 534.

One embodiment of a detector adjustment mechanism 580 that is tied to the mirror movement is shown in FIG. 9. The mechanism 580 includes a T-bar linkage 582 having a cross-member 581 and a main member 583 that is pivotally coupled to a mounting 584 at pivot point 585. The cross-member 581 includes rollers 588 and 589 mounted at the cross-member ends 590 and 591, respectively, upon which the detectors 570 and 575 are operatively mounted. A cross bar 586 pivotally couples to the main member 583 at pivot point 587 on one end and is fixed to the spot spacing stage 530 at the other end.

As the stage 530 translates to the right (relative to the orientation shown in FIG. 9) the spacing distance 'd' from the center point 551 of light spots 552 and 554 grows larger. In addition, the cross bar 586 translates to the right causing the T-bar 582 to pivot about points 585 and 587 toward the spot spacing stage 530. As the T-bar 582 pivots, detector 570 coupled to roller 588 moves downward and over, and detector 575 coupled to roller 589 moves upward and over (each movement relative to the orientation shown). Use of roller type couplings at rollers 590 and 591 maintains the detectors 570, 575 in the correct orientation relative to the target 550 during any movement of the detectors 570, 575. Movement of the detectors 570, 575 is limited to a discrete amount designed to correspond to the amount of translational movement of the spacing stage 530 so as to maintain the images produced on the detectors 570, 575 in optimized focus. In a like manner, when the spot spacing stage 530 is translated in the opposite direction, that is to the left as shown, the spots move closer together and may be overlapped at the center point 551. In response, the T-bar pivots away from the stage 530 causing detector 570 to move up and over, and detector 575 to move down and over to maintain the images in focus.

Alternatively, instead of the detector adjustment mechanism 580 being formed as a pivotally mounted T-bar mechanism, it may include other types of suitable movement mechanisms that tie the translational movement of the mirrors 532, 534 directly to adjustment of the detectors 570, 575. For example, a cam action mechanism may optionally be used, wherein the angle of the cam is designed to provide the desired movement of the detectors at an angle relative to the movement of the mirrors. Other types of suitable mechanisms may be evident to one of skill in the art, and all such are within the scope of the present invention.

The present invention provides numerous advantages over the measurement devices currently available. By use of a single light source, multiple simultaneous measurements may be made on a target to provide individual point data, as well as combined data and/or comparative data. Although multiple simultaneous measurements would be possible using multiple light sources, the measurement device of the present invention requires only a single input beam, thereby reducing the cost of the measurement device, the complexity of the optics and system controls, as well as the overall size of the device. The measurement device of the present invention also provides improved accuracy and faster measurement speeds, while reducing inaccuracies due to device and/or target movement and other mechanical part movement.

The measurement device of the present invention may be combined with other manufacturing mechanisms, such as those described above in the Background section, as part of a head suspension production line. Smaller size of the measurement device due to use of single light source facilitates inclusion of the device with other manufacturing components. By virtue of the rapid measurement speeds and accurate distance measurements achievable with the present invention measurement device, true dynamic adjustment of head suspension parameters based on these measurements is possible as part of a high speed manufacturing system, thus meeting the current needs of the head suspension industry.

Although the present invention has been described with reference to preferred embodiments, workers skilled in the art will recognize that changes may be made in form and detail without departing from the spirit and scope of the invention. In addition, the invention is not to be taken as limited to all of the details thereof as modifications and variations thereof may be made without departing from the spirit or scope of the invention.

What is claimed is:

1. A measurement device for simultaneously measuring the displacement of multiple locations on a target relative to a reference, the measurement device comprising:

a light source for producing a light beam;

optics for configuring the light beam as first and second differentiable beam portions, and for directing the first and second beam portions toward a target to be measured; and a position sensitive detection component, including first and second position sensitive detectors positioned to intercept first and second images, respectively, created by simultaneous incidence of the first and second beam portions at first and second locations, respectively, on the target, and to provide output information representative of the displacement of the target at the first and second locations relative to a reference based on the position of impingement of the first and second images on the position sensitive detection component.

2. The measurement device of claim 1, wherein the first and second locations comprise the same location on the target.

3. The measurement device of claim 1, wherein the optics include a polarizer for causing the first and second differentiable beam portions to have first and second different polarizations and create differently polarized first and second images on the target, respectively, and wherein first and second detector optical paths are polarization sensitive with the first detector optical path capable of passing the polarized first image created by the polarized first beam portion on to the first detector and the second detector optical path capable of passing the polarized second image created by the polarized second beam portion on to the second detector.

4. The measurement device of claim 3, wherein the detection component further comprises an imaging lens for focusing the differently polarized first and second images created by the first and second polarized beam portions, the imaging lens interposed between the target and the first and second detectors.

5. The measurement device of claim 4, wherein the detection component further comprises a partial reflector positioned to intercept the differently polarized first and second images, the partial reflector reflecting and directing at least part of one of the differently polarized first and second images toward one of the first and second detectors.

6. The measurement device of claim 5, wherein the partial reflector reflects and directs one of the differently polarized first and second images and passes the other.

7. The measurement device of claim 5, wherein the partial reflector comprises a beam splitter that splits the differently polarized first and second images, such that one part of each of the differently polarized first and second images is reflected resulting in differently polarized first and second reflected images, respectively, and another part of each of the differently polarized first and second images is passed through the beam splitter, resulting in differently polarized first and second passed images, respectively, and wherein one of the first and second detectors intercepts the differently polarized first and second reflected images and the other one of the first and second detectors intercepts the differently polarized first and second passed images.

8. The measurement device of claim 7, wherein the detection component further comprises first and second polarization analyzers interposed between the beam splitter and corresponding first and second detectors, respectively, one of the first and second analyzers intercepting and filtering the differently polarized first and second reflected images to provide a first purified polarized image to the corresponding one of the first and second detectors, and the other one of the first and second analyzers intercepting and filtering the differently polarized first and second passed images to provide a second purified polarized image having a different polarization that the first purified polarized image to the corresponding other one of the first and second detectors.

9. The measurement device of claim 4, wherein the imaging lens comprises a plurality of imaging lenses configured to cooperate as a lens set.

10. The measurement device of claim 1, wherein the first and second detectors communicate with a microprocessor that calculates displacement data for the first and second locations on the target relative to the reference.

11. The measurement device of claim 1, wherein the optics comprise a projection lens for focusing the light beam toward the target.

12. The measurement device of claim 11, wherein the optics further comprise a beam splitting device that splits the focused light beam into first and second differentiable portions.

13. The measurement device of claim 12, wherein the optics include a polarizer and wherein the first and second differentiable portions of the laser beam are polarized differently from one another.

14. The measurement device of claim 13, wherein the optics further include a beam directing device that directs the first and second differentiable portions in a desired direction.

15. The measurement device of claim 14, wherein the beam splitting device comprises the beam directing device and directs both first and second differentiable portions in substantially parallel paths toward the target.

16. The measurement device of claim 15, wherein the beam splitting device comprises a polarized beam splitting component and a reflecting component.

17. The measurement device of claim 16, wherein the beam splitting device comprises a polarizing beam splitter that splits the light beam into first and second polarized beam portions and directs the second beam portion toward the target, a quarter wave plate that rotates at least the first beam portion, and a movable mirror that reflects the rotated first beam portion back through the quarter wave plate and toward the target parallel to the second beam portion, the quarter wave plate again rotating the previously rotated first beam portion such that the rotated first beam portion is 90 degrees out of phase with the second beam portion.

18. The measurement device of claim 17, wherein the detection component further comprises:
first and second polarization sensitive detectors positioned to intercept the first and second images, respectively;
an imaging lens for focusing the differently polarized first and second images created by the first and second polarized beam portions, the imaging lens interposed between the target and the first and second detectors;
a partial reflector interposed between the imaging lens and the first and second detectors and positioned to intercept the differently polarized focused first and second images, the partial reflector including a beam splitter that splits the differently polarized first and second images, such that one part of each of the differently polarized first and second images is reflected resulting in differently polarized first and second reflected images, respectively, and another part of each of the differently polarized first and second images is passed through the beam splitter, resulting in differently polarized first and second passed images, respectively; and
first and second polarization analyzers interposed between the beam splitter and first and second detectors, respectively, the first analyzer intercepting and filtering the differently polarized first and second reflected images to provide a first purified polarized image to the first detectors, and the second analyzer intercepting and filtering the differently polarized first and second passed images to provide a second purified polarized image having a different polarization that the first purified polarized image to the second detectors.

19. The measurement device of claim 17, wherein the movable mirror is adjustable to space the first and second locations on the target relative to each other.

20. The measurement device of claim 14, wherein the beam splitting device comprises a Wollaston prism and wherein the beam directing device comprises first and second movable mirrors.

21. The measurement device of claim 20, wherein the beam directing device further comprises a reflecting cube interposed between the first and second movable mirrors and the target, wherein the first and second beam portions are reflected by the first and second movable mirrors, respectively, toward the reflecting cube, and wherein the reflecting cube directs the first and second beam portions in parallel toward the target.

22. The measurement device of claim 21, wherein the first and second movable mirrors are both adjustable to space the first and second locations on the target relative to each other.

23. The measurement device of claim 22,
wherein the first and second position sensitive detectors comprise first and second polarization sensitive detectors positioned to intercept the first and second images, respectively, and wherein the detection component further comprises:
an imaging lens for focusing the differently polarized first and second images created by the first and second polarized beam portions, the imaging lens interposed between the target and the first and second detectors;
a partial reflector interposed between the imaging lens and the first and second detectors and positioned to intercept the differently polarized focused first and second images, the partial reflector including a beam splitter that splits the differently polarized first and second images, such that one part of each of the differently polarized first and second images is reflected resulting in differently polarized first and second reflected images, respectively, and another part of each of the differently polarized first and second images is passed through the beam splitter, resulting in differently polarized first and second passed images, respectively; and
first and second polarization analyzers interposed between the beam splitter and first and second detectors, respectively, the first analyzer intercepting and filtering the differently polarized first and second reflected images to provide a first purified polarized image to the first detector, and the second analyzer intercepting and filtering the differently polarized first and second passed images to provide a second purified polarized image having a different polarization that the first purified polarized image to the second detector.

24. The measurement device of claim 23, wherein the optics further comprise a mirror movement mechanism for moving the movable mirrors.

25. The measurement device of claim 24, wherein the detection component further comprises a detector movement mechanism for moving the first and second detectors.

26. The measurement device of claim 25, wherein the mirror movement mechanism is coupled to the detector movement mechanism such that movement of the movable mirrors to alter spacing of the point on the target results in movement of the detectors for interception of the first and second images.

27. The measurement device of claim 26, wherein the detector movement mechanism comprises a pivotally mounted T-bar linkage that is pivotally coupled to the mirror movement mechanism, movement of the mirror movement mechanism resulting in direct movement of the first and second detectors, each at an angle relative to the movement of the mirror movement mechanism.

28. The measurement device of claim 27, wherein the angle comprises 45 degrees.

29. The measurement device of claim 26, wherein the detector movement mechanism comprises a cam action mechanism coupled to the mirror movement mechanism, movement of the mirror movement mechanism resulting in direct movement of the first and second detectors, each at an angle relative to the movement of the mirror movement mechanism.

30. The measurement device of claim 29, wherein the angle comprises 45 degrees.

31. A method of measuring a z-height distance relative to a reference at two locations on a disk drive head suspension, the method comprising the steps of:

provadounding a light beam;

splitting the light beam into first and second differentiable beam portions;

directing the first and second differentiable beam portions toward the two locations to be measured on the head suspension, and causing the beam portions to be reflected from the head suspension, wherein paths of the beam portions vary as a function of the z-height of the two locations with respect to the reference;

intercepting first and second images created by simultaneous incidence of the first and second differentiable beam portions on the target with a position sensitive detection component, the position sensitive detection component including first and second position sensitive detectors located to intercept the first and second images, respectively;

providing an output signal from the first and second position sensitive detectors representative of the position of the first and second images, respectively; and analyzing the output signal to calculate a desired z-height distance measurement for the two locations on the head suspension relative to a reference.

32. The method of claim 31, further comprising the steps of:

focusing the light beam after the step of splitting; and focusing the first and second images prior to the step of interception.

33. The method of claim 31, wherein the two locations are different locations on the target.

34. The method of claim 31, wherein the step of splitting includes passing the light beam through beam splitting optics to create the first and second differentiable beam portions.

35. The method of claim 34, wherein the beam splitting optics include a polarizer, and wherein the step of splitting includes splitting the light beam into first and second beam portions having first and second different polarizations, respectively.

36. The method of claim 34, wherein the beam splitting optics includes a beam directing device, and wherein the step of directing comprises interacting the first and second beam portions with the beam directing device to direct the first and second beam portions toward the head suspension.

37. The method of claim 36, wherein the beam directing device comprises a movable mirror, and wherein the step of directing comprises reflecting at least one of the first and second beam portions off the movable mirror toward the head suspension.

38. The method of claim 37, further comprising the step of adjusting the two locations on the head suspension by moving the movable mirror.

39. The method of claim 36, wherein the beam splitting optics comprises a Wollaston prism and the beam directing device comprises two movable mirrors, and wherein the step of splitting includes passing the light beam through the Wollaston prism to create first and second differently polarized beam portions that are then, in the step of directing, reflected off the two movable mirrors.

40. The method of claim 39, wherein the beam directing device further comprises a reflecting cube interposed between the two movable mirrors and the head suspension, and wherein the step of directing further includes passing the first and second polarized beam portions reflected by the two movable mirrors through the reflecting cube creating first and second parallel polarized beam portions directed toward the head suspension.

41. The method of claim 40, further comprising the step of adjusting the two locations on the head suspension by moving at least one of the two movable mirrors.

42. The method of claim 40, further comprising the step of adjusting the two locations on the head suspension by moving both of the movable mirrors.

43. The method of claim 42, further comprising the step of adjusting the position of the detection component relative to movement of the movable mirrors so as to maintain focus of the first and second images intercepted by the detection component.

44. The method of claim 43, wherein the step of adjusting further comprises coupling the positional movement of the detection component directly to movement of the movable mirrors to achieve automatic adjustment of the position of the detection component upon movement of the movable mirrors.

45. A method of measuring a distance between a target and a reference comprising the steps of:

providing a light beam;

splitting the light beam into a plurality of differentiable beam portions;

directing the plurality of differentiable beam portions toward a target to be measured;

detecting images created by simultaneous incidence of the plurality of differentiable beam portions on the target using a plurality of position sensitive detectors; and analyzing the output of the plurality of position sensitive detectors due to the locations of the detected images on the plurality of position sensitive detectors to calculate a desired distance measurement between the target and the reference.

* * * * *